US005702828A

United States Patent [19]
Adler et al.

[11] Patent Number: 5,702,828
[45] Date of Patent: Dec. 30, 1997

[54] PROCESS FOR WATERPROOFING GYPSUM MATERIALS

[75] Inventors: Klaus Adler; Erwin Gubisch, both of Burghausen, Germany; Alois Sommerauer, Tarsdorf, Austria

[73] Assignee: Wacker-Chemie GmbH, Munich, Germany

[21] Appl. No.: 605,615

[22] Filed: Feb. 22, 1996

[30] Foreign Application Priority Data

Feb. 23, 1995 [DE] Germany ............... 195 06 398.8

[51] Int. Cl.$^6$ ..................................... C14C 9/00
[52] U.S. Cl. .................. 428/540; 427/393.6; 524/5; 524/6
[58] Field of Search ............ 427/393.6; 524/5, 524/6; 428/540

[56] References Cited

U.S. PATENT DOCUMENTS

| | | | |
|---|---|---|---|
| 3,671,280 | 6/1972 | Smith | 106/116 |
| 3,869,415 | 3/1975 | Williams | 106/93 X |
| 4,851,047 | 7/1989 | Demlehner et al. | 106/111 |
| 5,041,475 | 8/1991 | Kambayashi et al. | 524/5 |
| 5,075,358 | 12/1991 | Riley et al. | 524/5 |
| 5,118,751 | 6/1992 | Schulze et al. | 524/503 |

FOREIGN PATENT DOCUMENTS

| | | |
|---|---|---|
| 0320982 | 6/1989 | European Pat. Off. . |
| 0477900 | 4/1992 | European Pat. Off. . |
| 0496682 | 7/1992 | European Pat. Off. . |
| 2153579 | 5/1973 | France . |
| 3704439 | 8/1988 | Germany . |
| 57-205352 | 12/1982 | Japan . |
| 05-836 | 1/1993 | Japan . |

OTHER PUBLICATIONS

English Derwent Abstract AN 73-37885U, no date.
English Derwent Abstract AN 92-251861, no date.
English Derwent Abstract AN 89-179851, no date.
Derwent Abstract AN 93-049442, Jun., 1993.
Derwent Abstract AN 83-10505K, May, 1983.

*Primary Examiner*—Michael Lusignan
*Attorney, Agent, or Firm*—Burgess, Ryan & Wayne

[57] ABSTRACT

The invention provides a process for water-proofing gypsum materials which comprises adding, to a pulverulent gypsum plaster composition containing from 10 to 90% by weight of gypsum based on the total weight of the composition, a mixture of a) from 1.0 to 15% by weight, based on the total weight of the composition, of one or more dispersion powders redispersible in water and based on vinyl acetate copolymers with ethylene and/or vinyl esters of $C_5$–$C_{15}$-monocarboxylic acids, styrene copolymers with acrylic esters of alcohols having from 1 to 18 carbon atoms, vinyl chloride copolymers with ethylene and/or vinyl esters of $C_2$–$C_{15}$ monocarboxylic acids, and b) from 0.05 to 5.0% by weight, based on the total weight of the composition, of one or more thixotropic additives from the group consisting of polyacrylic acids and their salts, smectites, bentonites, carboxymethylcelluloses and melamine-formaldehyde condensates.

12 Claims, No Drawings

PROCESS FOR WATERPROOFING GYPSUM MATERIALS

BACKGROUND OF THE INVENTION

1) Field of the Invention

The invention relates to a process for water-proofing gypsum materials by addition of a combination of dispersion powders redispersible in water and thixotropic additives.

2) Background Art

Gypsum is a building material available at low cost in large amounts. Apart from naturally occurring forms of calcium sulfate, considerable amounts of gypsum are obtained from flue gas desulfurization plants and there is worldwide interest in utilizing this material. Apart from the use of gypsum plaster in jointing compounds, gypsum mortars are used, in particular, for interior plastering and coatings. Owing to their water sensitivity, which also shows up in an unsatisfactory freeze/thaw behavior, plasters containing builder's plaster as a binder, with or without proportions of builder's lime, may, according to DIN standard 18550, only be used for interior plastering subject to normal stresses for this application but not for humid spaces or for exterior plastering.

Since gypsum plaster hardens with an increase in volume, it is the ideal binder for coatings and moldings so as to avoid possible crack formation. There have therefore been many attempts to produce facings using gypsum as a binder for example, for dwellings in the years of rapid industrial expansion in Germany. However, these facings had to be treated with hot linseed oil by a special impregnation and painting technique so as to make them resistant to weathering. Disadvantages are the high time expenditure and the high costs of this method.

For waterproofing of gypsum mortars, the use of silicones or siloxanes, stearates and paraffin waxes has also been proposed. Thus, for example, DE-A 3704439 (U.S. Pat. No. 4,851,047) discloses improving the weathering resistance of gypsum materials by addition of organopolysiloxanes to the gypsum mortar.

JP-A 5/836 (Derwent Abstract AN 93-49442) describes the waterproofing of cement and gypsum plaster using a pulverulent mixture of organopolymer and polysiloxane. JP-A 57/205352 (Derwent Abstract AN 83-10505K) describes the production of water-resistant gypsum moldings by addition of polymer latex to the gypsum mortar and subsequent heat treatment for curing the moldings.

Furthermore, EP-A 477900 (U.S. Pat. No. 5,118,751) discloses modifying mortar comprising inorganic binders such as cement, lime or gypsum plaster with dispersion powders redispersible in water so as to improve their mechanical properties such as adhesion, abrasion resistance and flexural strength.

SUMMARY OF THE INVENTION

It is an object of the invention to develop a process by means of which the water absorption of gypsum materials is reduced inexpensively and in a simple manner and the mechanical strength is increased at the same time.

The invention provides a process for waterproofing gypsum materials which comprises adding, to a pulverulent gypsum plaster composition containing from 10 to 90% by weight of gypsum based on the total weight of the composition, a mixture of a) from 1.0 to 15.0% by weight, based on the total weight of the composition, of one or more dispersion powders redispersible in water and based on vinyl acetate copolymers with ethylene and/or vinyl esters of $C_5$–$C_{15}$-monocarboxylic acids, styrene copolymers with acrylic esters of alcohols having from 1 to 18 carbon atoms, vinyl chloride copolymers with ethylene and/or vinyl esters of $C_2$–$C_{15}$-monocarboxylic acids, and b) from 0.05 to 5.0% by weight, based on the total weight of the composition, of one or more thixotropic additives from the group consisting of polyacrylic acids and their salts, smectites, bentonites, carboxymethylcelluloses and melamine-formaldehyde condensates.

If desired, the polymers specified additionally contain from 0.05% to 30.0% by weight, preferably from 0.5 to 15% by weight, in each case based on the total weight of the polymer, of one or more monomer units from the group of olefinically unsaturated, hydrolyzable silanes. Examples of such silanes are γ-acryl- or γ-methacryloxy-propyltri (alkoxy) silanes and vinyltrialkoxysilanes, with alkoxy groups capable of being used being, for example, methoxy ethoxy, methoxyethylene, ethoxyethylene, methoxypropylene glycol ether or ethoxypropylene glycol ether radicals. Furthermore, triacetoxyvinylsilane can be used. Preference is given to vinyltriethoxysilane, γ-methacryloxypropyltriethoxysilane and triacetoxyvinylsilane.

DESCRIPTION OF PREFERRED EMBODIMENTS

Preferred dispersion powders a) redipersible in water are based on:

vinyl acetate-ethylene copolymers containing from 20 to 50% by weight of ethylene units;

vinyl acetate copolymers containing from 1 to 40% by weight of vinyl laurate units and from 50 to 95% by weight of units of vinyl esters of α-branched $C_5$–$C_{10}$- monocarboxylic acids (versatic acid$^R$ vinyl ester and also, if desired, from 5 to 40% by weight of ethylene units, or vinyl acetate copolymers containing from 70 to 95% by weight of vinyl laurate units or units of vinyl esters of α-branched $C_5$–$C_{10}$-monocarboxylic acids (Versatic acid$^R$ vinyl ester);

styrone copolymers containing from 40 to 60% by weight of n-buryl acrylate and/or 2-ethylhexyl acrylate units, or vinyl chloride-ethylene copolymers having an ethylene content of from 10 to 40% by weight;

vinyl chloride copolymers containing from 10 to 40% by weight of ethylene units and from 5 to 40% by weight of vinyl laurate units or units of vinyl esters of α-branched $C_5$–$C_{10}$ -monocarboxylic acids.

The polymers mentioned as preferred can additionally contain the above-mentioned auxiliary monomers in the specific amounts. In each case, the percentages by weight given for the content of monomer units in the specified polymers add up to 100% by weight.

Particularly preferred dispersion powders a) are those based on:

vinyl acetate copolymers containing from 1 to 40% by weight of vinyl laurate units and from 1 to 30% by weight of units of vinyl esters of α-branched $C_9$–$C_{10}$- monocarboxylic acids such as VeoVa9$^R$, (vinyl esters of a synthetic saturated monocarboxylic acid mixture of highly branched $C_9$ or $C_{10}$ isomers produced by the Shell Corporation);

vinyl acetate copolymers containing from 70 to 95% by weight of units of vinyl esters of α-branched $C_9$–$C_{10}$- monocarboxylic acids such as VeoVa9$^R$ or VeoVa10$^R$;

vinyl chloride copolymers containing from 10 to 40% by weight of ethylene units and from 5 to 40% by weight of vinyl laurate units.

The preparation of the specified polymers is preferably carried out in a known manner by the emulsion polymerization process in aqueous medium, with initiation of the polymerization by means of the water-soluble free-radical formers customary for this purpose and in the presence of the emulsifiers and protective colloids usually used in emulsion polymerization.

To prepare the dispersion powders, the aqueous dispersion obtainable in this way is dried in a known manner, if desired with addition of atomization aids or antiblock agents, for example, by means of spray drying or freeze drying, preferably by spray drying.

Suitable components b) are:

high molecular weight homopolymers and copolymers of acrylic acid, their alkali metal and ammonium salts, water-swellable sheet silicates such as smectites (magnesium sheet silicates), organically modified smectites, bentonites (aluminum sheet silicates), montmorillonites; carboxymethylcelluloses and water-soluble melamine-formaldehyde condensates.

Preference is given to organically modified smectites and bentonites as are offered by industry as thickeners.

Among the types of gypsum plaster, preference is given to α- and β-hemihydrate ($CaSO_4 \cdot \frac{1}{2}H_2O$) in the form of, for example, builder's plaster, stucco plaster or modeling plaster. However, the process of the present invention is also suitable for modifying other types of gypsum plaster such as flooring plaster, Keene's cement and anhydrite. The calcium sulfate formed in flue gas desulfurization is also well suited.

The gypsum plaster composition can also contain the customary further constituents and additives. Customary further constituents for gypsum mortar are calcium hydroxide up to preferably from 1 to 30% by weight and inert fillers such as calcium carbonate, dolomite, light spar and/or quartz sand in customary amounts, preferably from 5 to 80% by weight. The percentages by weight given are in each case based on the total weight of the pulverulent gypsum plaster composition.

Additives which improve the processability of the gypsum plaster composition or the properties of products made therefrom are, for example, salts of long-chain fatty acids such as calcium stearate, sodium oleate, silicone building protection products fungicides, fibers, accelerators such as dipotassium hydrogen sulfate and retardants such as tartrates.

To modify the gypsum plaster, the dispersion powder a) and the additive b) are mixed and homogenized in suitable mixers with the gypsum plaster and, if desired, further constituents and additives. The dispersion powder can, if desired, also be added in the form of an aqueous dispersion. The additives b) can also be added in the form of their aqueous solutions or suspensions.

Preferably, a dry gypsum plaster composition is prepared and the water required for processing is added at the building site prior to processing.

The gypsum plaster compositions prepared according to the present invention are particularly suitable for use as gypsum mortar for renders or stucco work, especially in exterior applications. Further applications are, for example, as knifing fillers or for producing plasterboards or plaster molds.

In the context of the invention, it has surprisingly been found that the water absorption and thus the weathering resistance of gypsum plasters prepared according to the present invention using the combination of a) dispersion powder and b) defined thixotropic additives are decidedly improved. As shown by the comparative examples, this improvement is obtained neither with dispersion powder alone nor with dispersion powders in combination with conventional thickeners such as cellulose ethers and/or starch ethers.

The synergistically acting combination according to the present invention of dispersion powders redispersible in water a) with the components b) leads to gypsum renders which display no loss of adhesive strength even after outdoor weathering for a number of years. Comparison of the renders based on the examples according to the present invention with the renders based on the comparative examples, shows that the above-mentioned combination enables weathering-resistant gypsum renders to be prepared, while gypsum renders modified with conventional thickeners such as cellulose ethers or starch ethers even in the presence of dispersion powders. It was surprising that the gypsum plaster compositions modified using the process of the present invention led to gypsum renders which display no loss of adhesive strength even after outdoor weathering for a number of years; the adhesive strength of the gypsum renders which were exposed directly to weathering (rain and frost) is not affected in comparison with the covered renders.

The following examples serve to illustrate the invention:

Preparation of the mortar mixture:

In the Examples 1 to 8 and in the Comparative Examples 1 to 3, gypsum mortars were prepared using the formulations given in Tables 1 and 2. For this purpose, the formulation constituents were premixed in a dry state, the water was initially charged in mortar mixer and the dry mixture was stirred in.

The base formulation had the following composition:

300 parts by weight of gypsum plaster (Primoplast)

400 parts by weight of quartz sand No. 9a (grain size 0.1–0.4 mm)

214 parts by weight of quartz flour No. 10 (particle size up to 0.09 mm)

50 parts by weight of calcium hydroxide 2 parts by weight of fungicide Ca 24

1.5 parts by weight of dipotassium hydrogen phosphate and 400 parts by weight of water.

EXAMPLE 1

An additional 30 parts by weight of dispersion powder based on a vinyl chloride/vinyl laurate/ethylene copolymer (Vinnapas RI 551 Z, Wacker-Chemie GmbH) as component a) and 2.0 parts by weight of polyacrilic acid powder (RohagitS, Röhm GmbH) powder as component b) were incorporated into the base formulation.

EXAMPLE 2

An additional 30 parts by weight of dispersion powder based on a vinyl chloride/vinyl laurate/ethylene copolymer (Vinnapas RI 551 Z, Wacker-Chemie GmbH) as component a) and 2.0 parts by weight of water-soluble melamine-formaldehyde powder (Madurit MW 330, Hoechst AG) as component b) were incorporated into the base formulation.

EXAMPLE 3

An additional 30 parts by weight of dispersion powder based on a vinyl chloride/vinyl laurate/ethylene copolymer (Vinnapas RI 551 Z, Wacker-Chemie GmbH) as component a) and 2.0 parts by weight of polyacrylic acid powder (Carbopol 941, Goodyear) as component b) were incorporated into the base formulation.

EXAMPLE 4

An additional 30 parts by weight of dispersion powder based on a vinyl chloride/vinyl laurate/ethylene copolymer (Vinnapas RI 551 Z, Wacker-Chemie GmbH) as component a) and 2.0 parts by weight of polyacrylic acid powder (Carbopol 910, Goodyear) as component b) were incorporated into the base formulation.

EXAMPLE 5

An additional 30 parts by weight of dispersion powder based on a vinyl chloride/vinyl laurate/ethylene copolymer Vinnapas RI 551 Z, Wacker-Chemie GmbH) as component a) and 4.0 parts by weight of organically modified smectite (magnesium sheet silicate Bentone LT, Kronos-Titan GmbH) as component b) were incorporated into the base formulation.

EXAMPLE 6

An additional 30 parts by weight of dispersion powder based on a vinyl chloride, vinyl laurate, ethylene copolymer (Vinnapas RI 551 Z, Wacker-Chemie GmbH) as component a) and 4.0 parts by weight of bentonite (aluminum sheet silicate Thixoton CV 125, Südchemie AG) as component b) were incorporated into the base formulation.

EXAMPLE 7

An additional 30 parts by weight of dispersion powder based on a vinyl chloride/vinyl laurate/ethylene copolymer (Vinnapas RI 551 Z, Wacker-Chemie GmbH) as component a), 4.0 parts by weight of bentonite (aluminum sheet silicate Thixoton CV 15, Südchemie AG) and 2.0 parts by weight of polyacrylic acid powder (Carbopol 910, Goodyear) as component b) were incorporated into the base formulation.

EXAMPLE 8

An additional 30 parts by weight of dispersion powder based on a vinyl chloride/vinyl laurate/ethylene copolymer (Vinnapas RI 551 Z, Wacker-Chemie GmbH) as component a) and 2.0 parts by weight of carboxymethyl-cellulose (CMC CS 800, Wolff-Walsrode AG) as component b) were incorporated into the base formulation.

COMPARATIVE EXAMPLE 1

Conventional thickeners, namely 2.0 parts of methylcellulose (Tylose MC 6000 P, from Hoechst AG) and 0.5 parts by weight of starch ether (Amylotex 7086, from Aqualon) were incorporated into the base formulation, and no dispersion powder was used.

COMPARATIVE EXAMPLE 2

Conventional thickeners, namely 2.0 parts of methylcellulose (Tylose MC 6000 P, from Hoechst AG) and 0.5 parts by weight of starch ether (Amylotex 7086, from Aqualon) were incorporated into the base formulation, and 30 parts by weight of dispersion powder based on a vinyl acetate/ethylene copolymer (Vinnapas RE 530 Z, Wacker-Chemie GmbH) were incorporated as component a).

COMPARATIVE EXAMPLE 3

Conventional thickeners, namely 2.0 parts of methylcellulose (Tylose MC 6000 P, from Hoechst AG) and 0.5 parts by weight of starch ether (Amylotex 7086, from Aqualon) were incorporated into the base formulation, and 30 parts by weight of dispersion powder based on a vinyl chloride/ethylene copolymer/vinyl laurate (Vinnapas RI 551 Z, Wacker-Chemie GmbH) were incorporated as component a).

Use tests:

Preparation of the test specimens:

The mortar mixtures of the individual examples or comparative examples were each applied to a cement slab (concrete paver B550, 40×40×10 cm) by means of a trowel and a thickness of 2 cm was set with the aid of a template. The coated slabs were subsequently stored for 4 weeks under standard temperature and humidity conditions (23° C., 50% relative atmospheric humidity).

Testing of the processing behavior:

The processing behavior of the mortar during application was a assessed subjectively and assigned "++" for "very good" and "+" for "good". The results are shown in Table 1 and Table 2. Testing of the hardness of the the render:

The hardness of the render was assessed subjectively by scoring the render with a knife after the storage time had elapsed and the hardness was assigned "++" for "very good" and "+" for "good". The results are shown in Table 1 and Table 2.

Water drop test:

To test the water absorption, a drop of water having a volume of 0.5 ml was applied to the surface of the render by means of a pipette after the storage time had elapsed and the time taken for the drop to be adsorbed was determined. The results are shown in Table 1 and Table 2.

Testing of the adhesive pull strength:

To test the adhesive pull strength, the slabs coated with the renders from the examples or comparative examples were, after the four week storage time had elapsed, stored for 5 years in the open at an erection angle of 60° C. and in a south-west alignment. Part of the coated slabs (about 15% of the area) was protected from the direct action of precipitation by means of a hood of aluminum sheet placed over the upper end face of the slab. After the 5 years of exposure had elapsed, the adhesion of the covered and the uncovered gypsum render was determined. For this purpose, 6 test specimens were cut by means of a drill fitted with a circular cutter (diameter 55 mm) from each of the covered and uncovered parts of one slab one day before the testing date. Pulloff brackets were then adhesively bonded to the test specimens using a 2-component adhesive. The adhesive pull strength was determined in accordance with DIN 18156 using a pull-off apparatus from Herion using a loading rate of 250 N/S. The mean values for the adhesive pull strength of the individual trails are shown in Tables 1 and 2.

TABLE 1

| Formulation | Ex. 1 [pts by wt] | Ex. 2 [pts by wt] | Ex. 3 [pts by wt] | Ex. 4 [pts by wt] | Ex. 5 [pts by wt] | Ex. 6 [pts by wt] | Ex. 7 [pts by wt] | Ex. 8 [pts by wt] |
|---|---|---|---|---|---|---|---|---|
| Quartz sand No. 9a | 400 | 400 | 400 | 400 | 400 | 400 | 400 | 400 |
| Quartz flour No. 10 | 214 | 214 | 214 | 214 | 214 | 214 | 214 | 214 |
| Gypsum plaster | 300 | 300 | 300 | 300 | 300 | 300 | 300 | 300 |
| Calcium hydroxide | 50 | 50 | 50 | 50 | 50 | 50 | 50 | 50 |
| Fungicide Ca 24 | 2 | 2 | 2 | 2 | 2 | 2 | 2 | 2 |
| $K_2HPO_4$ | 1.5 | 1.5 | 1.5 | 1.5 | 1.5 | 1.5 | 1.5 | 1.5 |
| Component a) | 30 RI 551 Z | 30 RI 551 Z | 30 RI 551 Z | 30 RI 551 Z | 30 RI 551 Z | 30 RI 551 Z | 30 RI 551 Z | 30 RI 551 Z |
| Component b) | 2.0 Rohagit | 2.0 Madurit | 2.0 Carbopol 941 | 2.0 Carbopol 910 | 4.0 Bentone | 4.0 Tixoton | 4.0 Tixoton + 2.0 Carb. 910 | 2.0 CMC CS 800 |
| Water | 400 | 400 | 400 | 400 | 400 | 400 | 400 | 400 |
| Test results: | | | | | | | | |
| Processing behavior | + | + | ++ | ++ | + | ++ | ++ | + |
| Hardness (scratch test) | + | ++ | + | + | + | + | + | + |
| Water drop test [min] | 120 | 180 | 240 | 260 | >300 | >300 | >300 | 120 |
| Adhesive pull strength [N/m²] | | | | | | | | |
| Covered slab | 0.13 | 0.55 | 0.38 | 0.39 | 0.44 | 0.32 | 0.57 | 0.43 |
| Uncovered slab | 0.22 | 0.53 | 0.20 | 0.49 | 0.45 | 0.43 | 0.44 | 0.45 |

TABLE 2

| Formulation | Comp. Ex. 1 [parts by wt] | Comp. Ex. 2 [parts by wt] | Comp. Ex. 3 [parts by wt] |
|---|---|---|---|
| Quartz sand No. 9a | 400 | 400 | 400 |
| Quartz flour No. 10 | 214 | 214 | 214 |
| Gypsum plaster | 300 | 300 | 300 |
| Calcium hydroxide | 50 | 50 | 50 |
| Fungicide Ca 24 | 2 | 2 | 2 |
| $K_2HPO_4$ | | 1.5 | 1.5 |
| Component a) | | 30 RE 530 Z | 30 RI 551 Z |
| Methylcellulose | 2.0 | 2.0 | 2.0 |
| Starch ether | 0.5 | 0.5 | 0.5 |
| Water | 400 | 400 | 400 |
| Test results: | | | |
| Processing behavior | + | + | ++ |
| Hardness (scratch test) | + | + | + |
| Water drop test [min] | 0.5 | 15 | 90 |
| Adhesive pull strength [N/mm²] | | | |
| covered slab | loss of adhesion after 1.5 years | loss of adhesion after 2 years | 0.49 |
| uncovered slab | render weathered, fallen off | render fallen off | 0.08 |

We claim:

1. A process for waterproofing gypsum materials which comprises adding, to a pulverulent gypsum plaster composition containing from 10 to 90% by weight of gypsum based on the total composition weight of the composition, a mixture of a) from 1.0 to 15.0% by weight, based on the total weight of the composition, of one or more dispersion powders redispersible in water and based on vinyl acetate copolymers with ethylene and/or vinyl esters of $C_5$–$C_{15}$-monocarboxylic acids, styrene copolymers with acrylic esters of alcohols having from 1 to 18 carbon atoms, vinyl chloride copolymers with ethylene and/or vinyl esters of $C_2$–$C_{15}$ monocarboxylic acids, and b) from 0.05 to 5.0% by weight, based on the total weight of the composition, of at least one thixotropic additive selected from the group consisting of polyacrylic acids and their salts, smectites, bentonites, carboxymethylcelluloses, and melamine-formaldehyde condensates.

2. The process as claimed in claim 1, wherein the polymers redispersible in water are based on vinyl acetate-ethylene copolymers containing from 20 to 50% by weight of ethylene units, vinyl acetate copolymers containing from 1 to 40% by weight of vinyl laurate units and from 50 to 95% by weight of units of vinyl esters of α-branched $C_5$–$C_{10}$ monocarboxylic acids, and also, if desired, from 5 to 40% by weight of ethylene units, or vinyl acetate copolymers containing from 70 to 95% by weight of vinyl laurate units or units of vinyl esters of α-branched $C_5$–$C_{10}$-monocarboxylic acids (Versatic acid$^R$ vinyl ester); styrene copolymers containing from 40 to 60% by weight of n-butyl acrylate and/or 2-ethylhexyl acrylate units, vinyl chloride-ethylene copolymers having an ethylene content of from 10 to 40% by weight, vinyl chloride copolymers containing from 10 to 40% by weight of ethylene units and from 45 to 40% by weight of vinyl laurate units or units of vinyl esters of α-branched $C_5$–$C_{10}$ monocarboxylic acids.

3. The process as claimed in claim 1, wherein the polymers redispersible in water are based on vinyl acetate copolymers containing from 1 to 40% by weight of vinyl laurate units and from 1 to 30% by weight of units of vinyl esters of α-branched $C_9$–$C_{10}$ monocarboxylic acids, vinyl acetate copolymers containing from 70 to 95% by weight of units of vinyl esters of α-branched $C_9$–$C_{10}$ monocarboxylic acids, vinyl chloride copolymers containing from 10 to 40% by weight of ethylene units and from 5 to 40% by weight of vinyl laurate units.

4. The process as claimed in claim 1 wherein the thixotropic additives used are selected from the group consisting of high molecular weight homopolymers and copolymers of acrylic acid, their alkali metal and ammonium salts; water-swellable sheet silicates, organically modified smectites, bentonites (aluminum sheet silicates), montmorillonites; carboxymethylcelluloses; and water-soluble melamine-formaldehyde condensates.

5. The process as claimed in claim 1 wherein the thixotropic additives used are organically modified smectites and bentonites.

6. The process as claimed in claim 1 wherein the gypsum plaster used is α- β-hemihydrate ($CaSO_4 \cdot \frac{1}{2}H_2O$), flooring plaster, Keene's cement, anhydrite or calcium sulfate formed in flue gas desulfurization.

7. The process as claimed in claim 1 wherein the components a) and b) are mixed and homogenized together with the gypsum plaster and additional constituents or additives.

8. The process as claimed in claim 2 wherein the vinyl acetate copolymers containing from 1 to 40% by weight of vinyl laurate units and from 50 to 95% by weight of units of vinyl esters of α-branched $C_5$–$C_{10}$ monocarboxylic acids also contain from 5 to 40% by weight of ethylene units.

9. A process for waterproofing gypsum materials which comprises adding to said materials a mixture of:

a) one or more dispersion powders redispersible in water and based on vinyl acetate copolymers with ethylene and/or vinyl esters of $C_5$–$C_{15}$-mono-carboxylic acids, styrene copolymers with acrylic acid esters of alcohols having from 1 to 18 carbon atoms, vinyl chloride copolymers with ethylene and/or vinyl esters of $C_2$–$C_{15}$ monocarboxylic acids, and b) one or more thixotropic additives selected from the group consisting of polyacrylic acids and their salts, smectites, bentonites, carboxymethylcelluloses and melamine-formaldehyde condensates.

10. The waterproof gypsum materials prepared by the process of claim 9.

11. In a process for the application of stucco plaster to an exterior surface which is exposed to the weather, the improvement which comprises applying to said surface a stucco plaster which contains the mixture of claim 9.

12. In a process for the production of plasterboards or plaster molds from a gypsum plaster composition, the improvement which comprises adding to said compositions the mixture of claim 9.

* * * * *

UNITED STATES PATENT AND TRADEMARK OFFICE
CERTIFICATE OF CORRECTION

PATENT NO. : 5,702,828
DATED : December 30, 1997
INVENTOR(S) : Klaus Adler et al.

It is certified that error appears in the above-indentified patent and that said Letters Patent is hereby corrected as shown below:

Column 8, lines 58-59: "from 45 to 40% by weight of vinyl laurate units" should read --from 5 to 40% by weight of vinyl laurate units--.

Signed and Sealed this

Second Day of June, 1998

*Attest:*

BRUCE LEHMAN

*Attesting Officer*      *Commissioner of Patents and Trademarks*